United States Patent [19]

Itoh et al.

[11] Patent Number: 5,585,817
[45] Date of Patent: Dec. 17, 1996

[54] APPARATUS AND A METHOD FOR INPUTTING/OUTPUTTING AN IMAGE

[75] Inventors: Masataka Itoh, Nara; Tatsuo Morita, Kyoto; Shuhei Tsuchimoto, Nara-ken, all of Japan

[73] Assignee: Sharp Kabushiki Kaisha, Osaka, Japan

[21] Appl. No.: 63,951

[22] Filed: May 20, 1993

[30] Foreign Application Priority Data

May 20, 1992 [JP] Japan .................. 4-127251

[51] Int. Cl.$^6$ .................. G09G 3/36
[52] U.S. Cl. .................. 345/104; 349/116
[58] Field of Search .................. 345/104, 115, 345/173, 102; 178/18, 19; 361/220; 359/59, 72; 348/602, 791; 257/448, 444

[56] References Cited

U.S. PATENT DOCUMENTS

| | | | |
|---|---|---|---|
| 3,153,172 | 10/1964 | Ling | 348/602 |
| 3,419,745 | 12/1968 | Wenzel | 348/602 |
| 3,956,745 | 5/1976 | Ellis | 345/104 |
| 4,345,248 | 7/1982 | Togashi et al. | 345/87 |
| 4,529,968 | 7/1985 | Hilsum et al. | 345/104 |
| 4,746,989 | 5/1988 | Cannella et al. | 257/443 |
| 4,794,634 | 12/1988 | Torihata et al. | 345/104 |
| 4,827,085 | 5/1989 | Yaniv et al. | 345/104 |
| 4,839,634 | 6/1989 | More et al. | 345/104 |
| 4,894,699 | 1/1990 | Hayashi et al. | 257/444 |
| 4,982,079 | 1/1991 | Yagyu | 361/220 |
| 5,122,787 | 6/1992 | Fujita et al. | 345/173 |
| 5,151,688 | 9/1992 | Tanaka et al. | 345/104 |
| 5,162,782 | 11/1992 | Yoshioka | 345/104 |
| 5,270,711 | 12/1993 | Knapp | 345/104 |
| 5,446,564 | 7/1995 | Mawatari et al. | 359/72 |

FOREIGN PATENT DOCUMENTS

| | | | |
|---|---|---|---|
| 0109832 | 5/1984 | European Pat. Off. . | |
| 0117957 | 9/1984 | European Pat. Off. . | |
| 119899 | 4/1979 | Japan | 345/104 |
| 59-223055 | 12/1984 | Japan . | |
| 61-230558 | 10/1986 | Japan . | |
| 62-104262 | 5/1987 | Japan . | |
| 62-171264 | 7/1987 | Japan . | |
| 3102320 | 4/1991 | Japan . | |
| 4251824 | 8/1992 | Japan | 345/104 |

*Primary Examiner*—Richard Hjerpe
*Assistant Examiner*—Amare Mengistu

[57] ABSTRACT

A device and a method for inputting/outputting an image are disclosed. The device includes: an image display section which selectively transmits light; and an image input section having a photodetective portion for converting part of the light which has been transmitted through the image display section and reflected from an original surface to be imaged, into an electric signal. The method is performed by using the device.

7 Claims, 7 Drawing Sheets

APPARATUS AND A METHOD FOR INPUTTING/OUTPUTTING AN IMAGE

BACKGROUND OF THE INVENTION

1. Field of the Invention

The present invention relates to an image input/output apparatus and an image input/output method. More particularly, the present invention relates to an image input/output apparatus in which an image display section and an image input section are integrated into a unit, so that the apparatus is miniaturized and the construction of the apparatus is simplified. The present invention also relates to an image input/output method using the image input/output apparatus.

2. Description of the Related Art

As a conventional image display apparatus, an active matrix type liquid crystal display apparatus is known. FIG. 6 shows an exemplary active matrix type liquid crystal display apparatus. In the active matrix type liquid crystal display apparatus, one of liquid crystal portions 251, 252, . . . and one of thin film transistors (TFTs) 241, 242, . . . are paired so as to constitute a pixel. During the operation, the TFTs in respective rows are turned on or off by a gate drive circuit 200 via corresponding gate lines 211, 212, . . . . Also, data (voltage) is sequentially written into the respective liquid crystal portions 251, 252, . . . by a data drive circuit 202 via corresponding data lines 231, 232, . . . , so as to perform a display.

On the other hand, as an image input apparatus, a contact type image sensor is known. In the contact type image sensor, a one-dimensional sensor array is made so as to have a length which is equal to the width of an original, i.e., original surface to be imaged, and the reflected light from the original surface is detected by the respective sensors in the sensor array. When a two-dimensional original surface is to be read by the contact type image sensor, the image sensor or the original surface is required to be mechanically moved in a direction perpendicular to the sensor array for scanning. In order to eliminate the mechanical movement for scanning, a structure such as that shown in FIG. 7 is proposed. In the structure, pairs of photodetective layers 315 and TFTs 311 are provided in a matrix form on a transparent substrate 301 (for simplicity, only one pair of which is shown in FIG. 7). In FIG. 7, a transparent protecting layer 302 is formed over the entire surface of the transparent substrate 301. Then, a thin glass plate 303 is provided on the transparent protecting layer 302. In this image input apparatus, an original surface 313 is illuminated by light 312 incident from the side on which the transparent substrate 301 is provided. Then, the reflected light 314 from the original surface 313 is detected by the photodetective layer 315 which converts the detected light into an electric signal. The converted electric signal is supplied via the TFTs to a scanning circuit (not shown), and taken out by the scanning circuit as a time-series signal.

As described above, conventionally, the image display and the image input are separately performed by different types of apparatus. For example, in a work station or a personal computer, a display is provided independently of an image reader and a scanner. The connection therebetween is realized via an interface.

In recent years, small-sized computers have been manufactured, so that there is a requirement for peripheral image input/output apparatus to be compact in size. However, according to the prior art as described above, the image display and the image input are separately performed by different types of apparatus, which prevents the image input/output apparatus from being miniaturized. Moreover, both the apparatus necessitate their own scanning circuits, respectively. This causes a problem in that the construction of the apparatus cannot be simplified. Especially in the case of a two-dimensional image sensor, it is necessary to scan the photodetective layers which are provided separately for respective pixels, and it is necessary to provide an optical system (a lens, or the like) for illuminating an original surface. Therefore, the construction of the two-dimensional image sensor is complicated.

SUMMARY OF THE INVENTION

The image input/output apparatus of this invention includes: an image display section which selectively transmits light; and an image input section having a photodetective portion for converting part of the light which has been transmitted through the image display section and reflected from an original surface to be imaged, into an electric signal.

In one embodiment of the invention, the image display section includes: a first transparent substrate; a second transparent substrate which is opposite to the first transparent substrate; a liquid crystal portion which is sandwiched between the first transparent substrate and the second transparent substrate; a plurality of pixel electrodes disposed in a matrix form, the plurality of pixel electrodes being disposed on a surface of the first transparent substrate on a side where the liquid crystal portion is provided; a counter electrode disposed on a surface of the second transparent substrate on a side where the liquid crystal portion is provided; and means for selectively applying voltage to at least desired one of the plurality of pixel electrodes.

In another embodiment of the invention, the photodetective portion is disposed on a portion of the second transparent substrate, the portion corresponding to a portion of the first transparent substrate where the plurality of pixel electrodes are not disposed.

In another embodiment of the invention, the photodetective portion includes: a lower electrode capable of blocking light; a photo-electric converting element formed on the lower electrode; and an upper electrode formed on the photo-electric converting element.

In another embodiment of the invention, each of the lower electrode and the upper electrode is a single portion with electric continuity.

In another embodiment of the invention, each of the lower electrode and the upper electrode is divided into a plurality of blocks which are electrically separated from each other.

According to another aspect of the invention, an image input/output apparatus is provided. The image input/output apparatus includes: a pair of transparent substrates with liquid crystal sandwiched therebetween; transparent electrodes which constitute pixels, the transparent electrodes being provided on a inner surface of one of the pair of transparent substrates; means for selectively applying voltage to the transparent electrodes; a photodetective portion provided on the other one of the pair of transparent substrates on a side on which the liquid crystal is not formed; and a transparent layer which covers the photodetective portion. In the apparatus, during an image output, light incident from the outside of the other one of the pair of transparent substrates is selectively transmitted by the transparent electrodes, whereby an image is displayed, and during an image input, part of light which is selectively transmitted by the transparent electrodes, and then reflected from an original surface to be imaged and incident on the photodetective portion is converted into an electric signal, whereby an image signal is produced.

According to still another aspect of the invention, a method for inputting/outputting an image is provided. The method uses the image input/output apparatus according to the invention, and includes the steps of: sequentially applying voltage to at least any desired one of said plurality of pixel electrodes while irradiating said image display section with light, to selectively transmit part of light for scanning said original surface; and receiving light reflected from said original surface by said photodetective portion, to sequentially convert said received light into an electric signal by said photo-electric converting element.

According to the invention, an image display section and an image input section are constructed into a unit, so that the apparatus is miniaturized. Moreover, since the image display and the image input can be performed by a single scanning circuit, the construction of the apparatus is simplified.

In addition, when the photodetective portion is formed in an area corresponding to gaps between pixels in the image display section, the light which is transmitted through the image display section will not be blocked by the photodetective portion. Therefore, the contrast for image display and image input is improved.

During the image input, individual pixels are selected by the image display section. Therefore, it is unnecessary to separate the photodetective portion in the image input section into portions for the respective pixels. Moreover, during the image input, the original surface is located close to the surface of the transparent layer of the image input section, so that there is no need to provide an optical system such as a lens.

Thus, the invention described herein makes possible the advantages of (1) providing an image input/output apparatus in which an image display section and an image input section are integrated into a unit, so that the apparatus is miniaturized and the construction of the apparatus can be simplified, and (2) providing an image input/output method which uses the image input/output apparatus.

These and other advantages of the present invention will become apparent to those skilled in the art upon reading and understanding the following detailed description with reference to the accompanying figures.

DESCRIPTION OF THE PREFERRED EMBODIMENTS

Hereinafter, an image input/output apparatus and an image input/output method of the invention will be described by way of an example.

Figure 1:
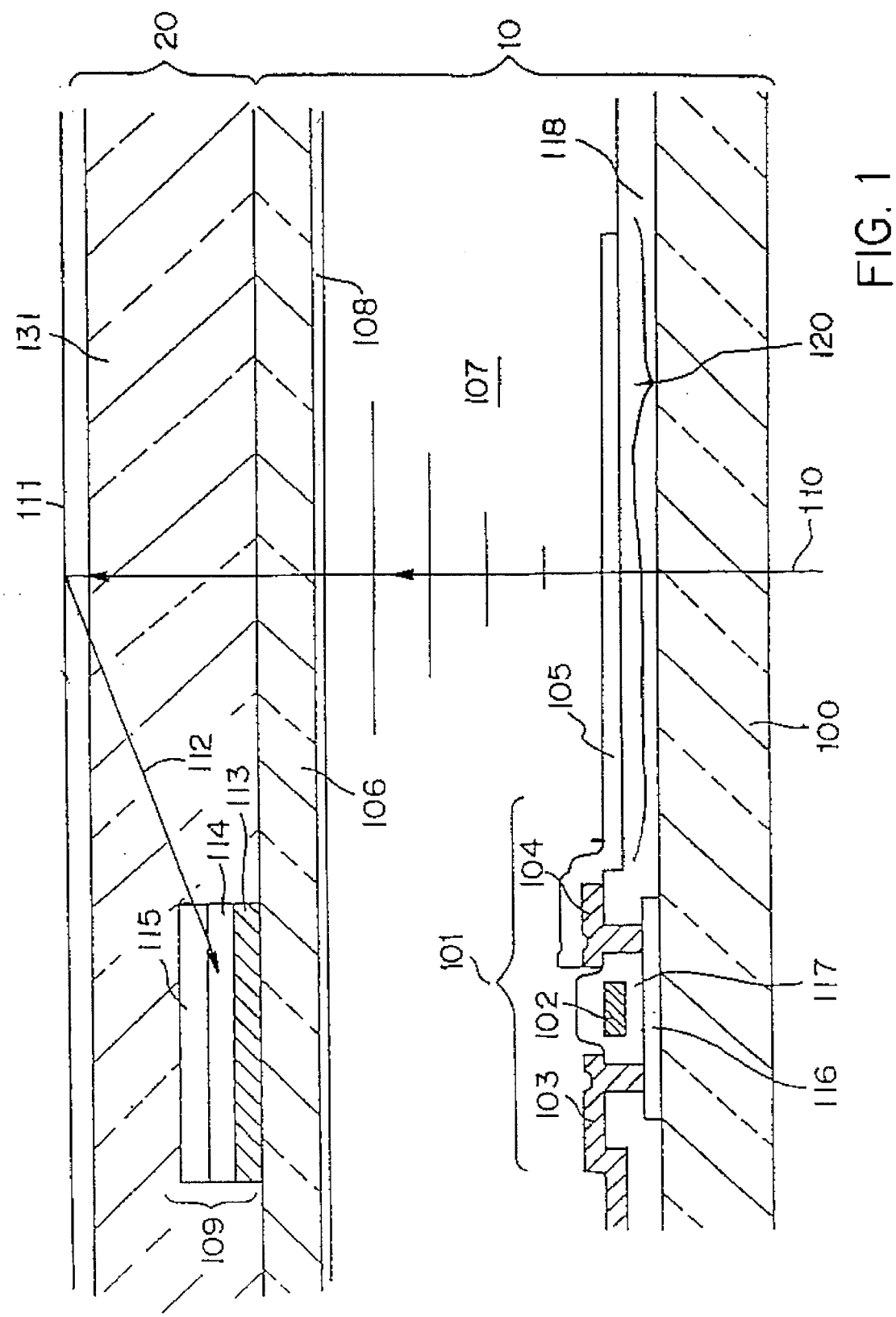
FIG. 1 is a view showing a cross-sectional structure of an image input/output apparatus in one example according to the invention.
Figure 2:
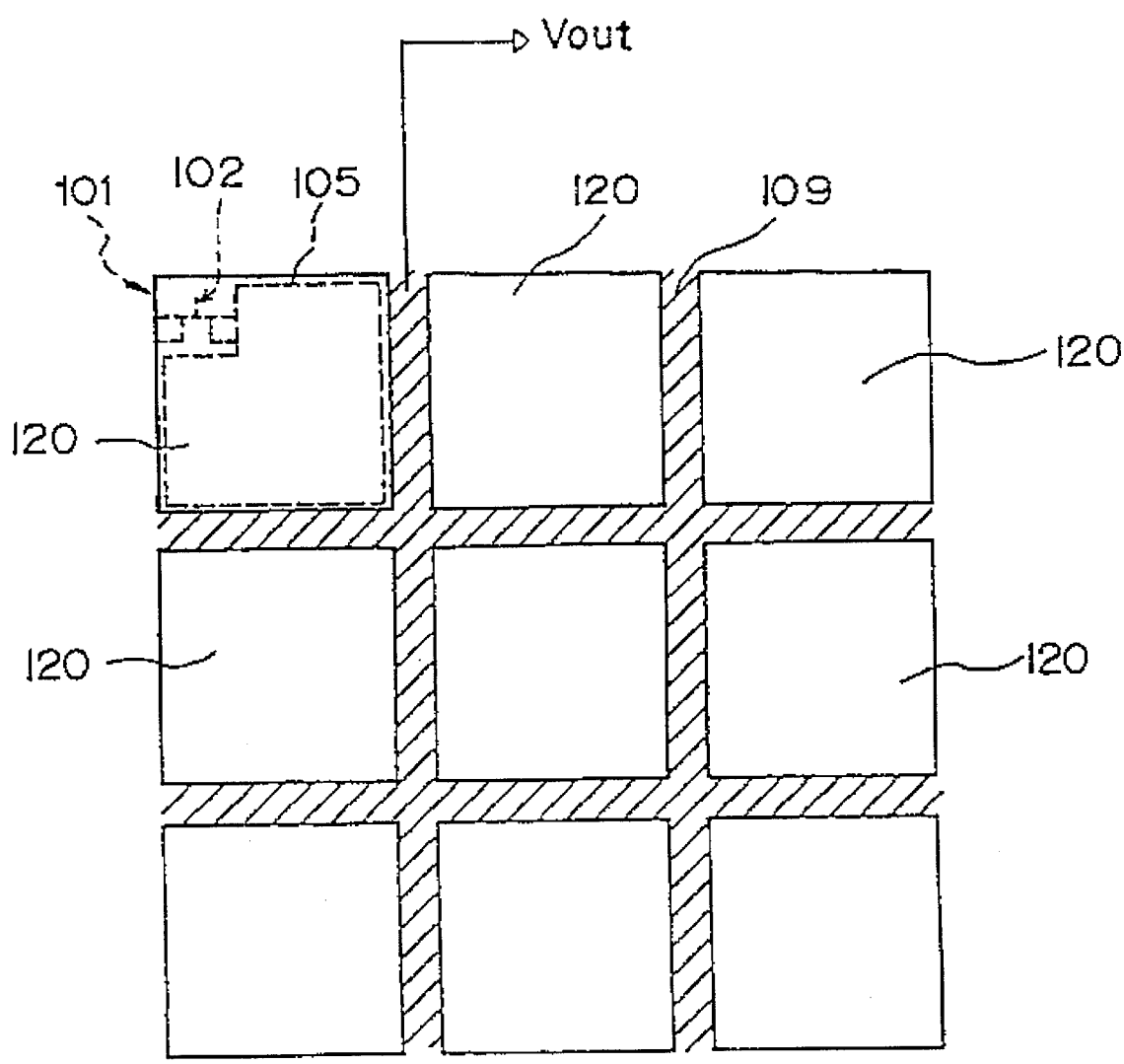
FIG. 2 shows a pattern of pixels and a photodetective portion in the image input/output apparatus according to the invention.

FIGS. 1 and 2 show a cross-sectional structure and a schematic pattern of an image input/output apparatus in one example according to the invention, respectively. As is shown in FIG. 1, the image input/output apparatus includes an image display section (an active matrix type liquid crystal display device) 10 and an image input section 20.

The image display section 10 includes a pair of transparent substrates 100 and 106 with a ferroelectric liquid crystal 107 sandwiched therebetween. On their facing surfaces of the transparent substrates 100 and 106, a transparent electrode 105 having a predetermined pattern which constitutes a pixel 120, and a transparent electrode (or counter electrode) 108 are disposed. The transparent electrodes 105 and 108 are made of ITO (indium tin oxide) films. Also on the surface of the transparent substrate 100, a thin film transistor (TFT) 101 is formed for each of the pixels 120. The TFT 101 is constituted by a channel layer 116 of polycrystalline silicon, a gate insulating film 117, a gate electrode 102, a source electrode 103, and a drain electrode 104. The drain electrode 104 is connected to the transparent electrode 105. An insulating layer 118 is formed on the transparent substrate 100.

Figure 3:
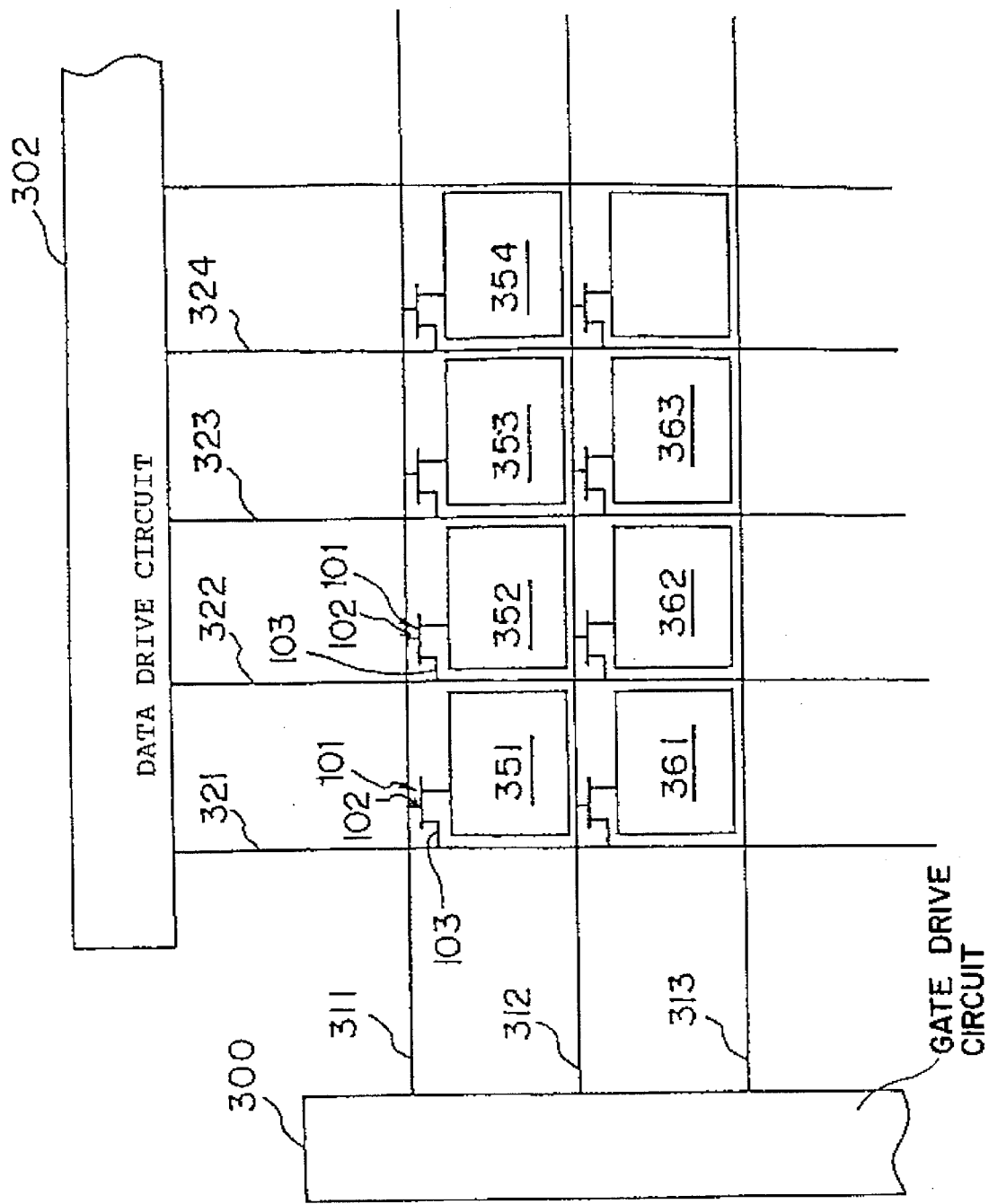
FIG. 3 is a diagram showing an equivalent circuit of the image input/output apparatus according to the invention.

As is shown in FIG. 3, the image input/output apparatus of this example includes a gate drive circuit 300 and a data drive circuit 302 as in the conventional liquid crystal display apparatus. The gate drive circuit 300 is connected to the gate electrodes 102 of the respective TFTs 101 via gate lines 311, 312, . . . . The data drive circuit 302 is connected to the source electrodes 103 of the respective TFTs 101 via data lines 321, 322, . . . .

Referring back to FIG. 1, the image input section 20 includes a photodetective portion 109 formed on the transparent substrate 106, and a transparent protective layer 131 for protecting the photodetective portion 109. The photodetective portion 109 receives light and converts it into an electric signal. The photodetective portion 109 has a three-layer structure including a lower electrode 113 capable of blocking light, a semiconductor layer 114 for photo-electric conversion (or photo-electric converting means), and a transparent upper electrode 115. As is shown in FIG. 2, the photodetective portion 109 is formed in an area between the respective pixels 120, so that the photodetective portion 109 has a lattice-like shape. The photodetective portion 109 is formed in the following manner. First, the above three layers are formed on the entire surface of the transparent substrate 106. Then, portions of the three layers which are positioned above the respective pixels 120 are removed, so as to form the photodetective portion 109. As a result, the photodetective portion 109 is formed only above the gate lines 311, 312, . . . , and the data lines 321, 322, . . . which are shown in FIG. 3. By forming the photodetective portion 109 as described above, the light for display or read cannot be blocked by the photodetective portion 109, so that the contrast during the operation can be improved.

As described above, in the image input/output apparatus, the image display section 10 and the image input section 20 are constructed into a single unit. As a result, the size of the apparatus can be reduced as compared with the conventional case where the sections are separately provided.

During the image display, as in the conventional liquid crystal display apparatus, light (so called, back light) 110 is incident on the image display section 10 substantially perpendicular thereto, from the side on which the transparent substrate 100 is provided. The light 110 is transmitted or blocked by the respective pixels 120 in accordance with the voltage applied to the transparent electrodes 105 and 108. Specifically, the TFTs in respective rows are turned on or off by the gate drive circuit 300 shown in FIG. 3 via the gate lines 311, 312, . . . . Data is sequentially written into respective liquid crystal portions (pixels) 351, 352, . . . by the data drive circuit 302 via the data lines 321, 322, . . . , so as to perform a display.

Figure 4:
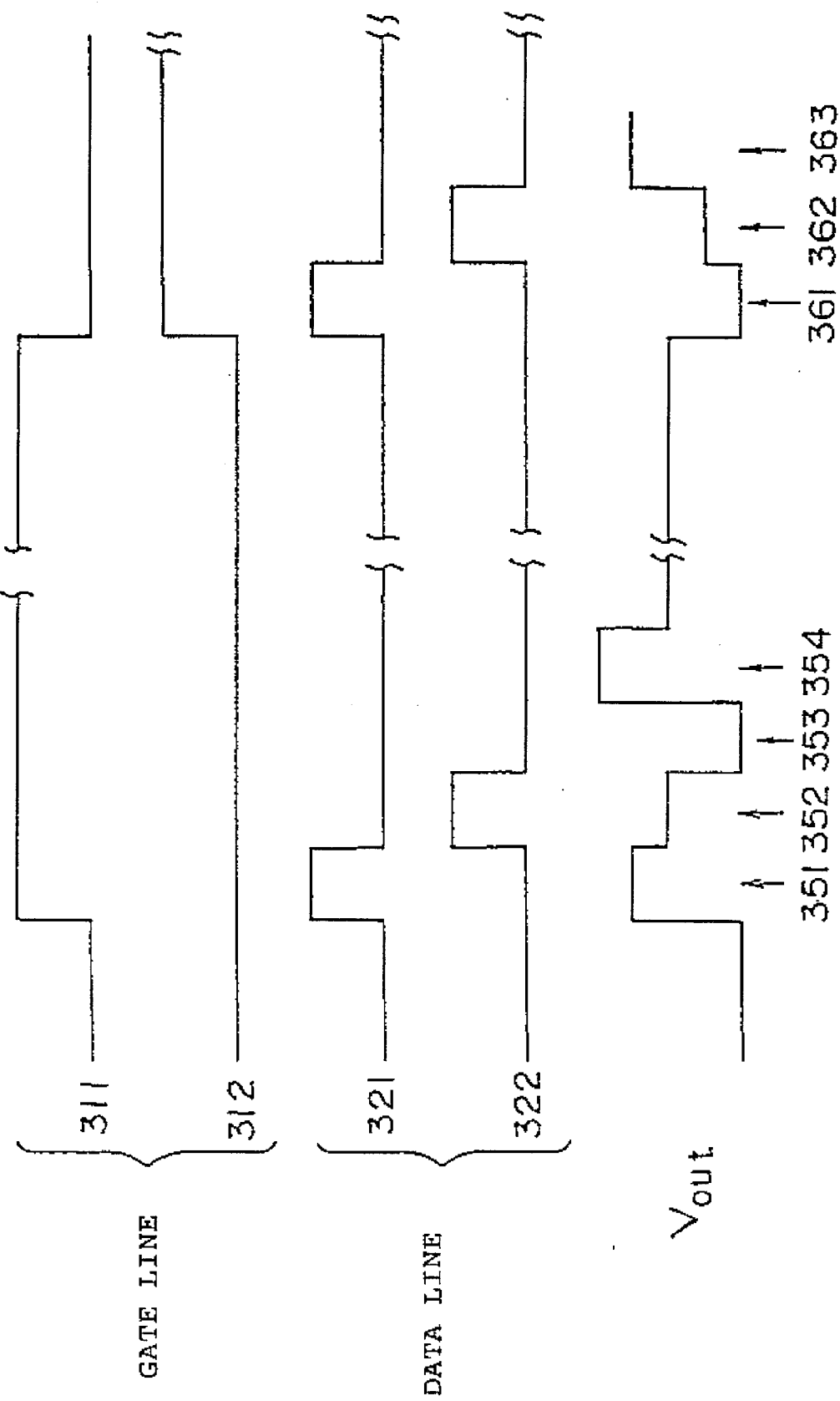
FIG. 4 is a diagram for explaining a scanning method during an image input of the image input/output apparatus according to the invention.

When an image is to be input, as is shown in FIG. 1, an original surface-to-be-imaged 111 is located close to the surface of the transparent protective layer 131 of the image input section 20. The photodetective portion 109 detects the reflected light 112 of the light 110 which is transmitted through the image display section 10 in accordance with the voltage applied to the transparent electrodes 105 and 108 and reflected from the original surface 111. For example, as is shown in FIG. 4, a high level voltage is applied to the gate line 311 shown in FIG. 3, so that the TFTs 101 in the first row are turned on. In this state, a high level voltage pulse is first applied to the data line 321. As a result, the pixel 351 at the position of the first row and the first column as shown in FIG. 3 is turned on, so that the light 110 illuminates a portion of the original surface 111 corresponding to the pixel 351 (i.e., a portion directly above the pixel 351). At this time, the reflected light 112 which is reflected from the original surface 111 is detected by the photodetective portion 109. The reflected light 112 is taken out as an output $V_{out}$ as is shown in FIG. 4. Next, a high level voltage pulse is applied to the data line 322. Thus, the light 110 illuminates a portion of the original surface 111 directly above the pixel 352, and the output $V_{out}$ of the photodetective portion 109 is taken out. After completing the scanning for the first row, the scanning for the second row is performed in the same manner. In this way, the output $V_{out}$ of the photodetective portion 109 can be taken out as time-series signals corresponding to the scanning of the pixels 351, 352, . . . . Thus, the whole image of the original 111 can be read.

In the image input/output apparatus of this example, the gate drive circuit 300 and the data drive circuit 302 are used for both the operations of the image display and the image input. That is, the image input/output apparatus necessitates a single scanning circuit for both the image display and input operations. Therefore, the construction of the apparatus can be simplified as compared with the case where separate scanning circuits are required for the image display operation and the image input operation.

During the image input, portions of the original surface 111 corresponding to the respective pixels are selected by the image display section 10. Therefore, it is unnecessary to separately provide the photodetective portions 109 of the image input section 20 for the respective pixels.

During the image input, as is shown in FIG. 1, the original surface 111 is located close to the surface of the transparent protective layer 131 of the image input section 20 in order to read the image on the original surface 111. Therefore, it is also unnecessary to provide an optical system such as a lens.

If a distance between the original surface 111 and the photodetective portion 109 is made larger, the reflected light 112 spreads, so as to degrade the resolution. If the distance between the original surface 111 and the photodetective portion 109 is too small, the reflected light 112 will not be incident on the photodetective portion 109, so as to degrade the S/N ratio. In this example, the divergent angle of the incident light 110 is about 90°, and in order to obtain the resolution of 8 dots/mm, the thickness of the transparent protective layer 131 is set to be about 100 μm.

As the result of the experiment, the image input/output apparatus with the resolution of 8 dots/mm could read an image on the screen of 10 inches (1627×1219 pixels) for 20 seconds (i.e., a rate of 10 μs per pixel).

Figure 5:
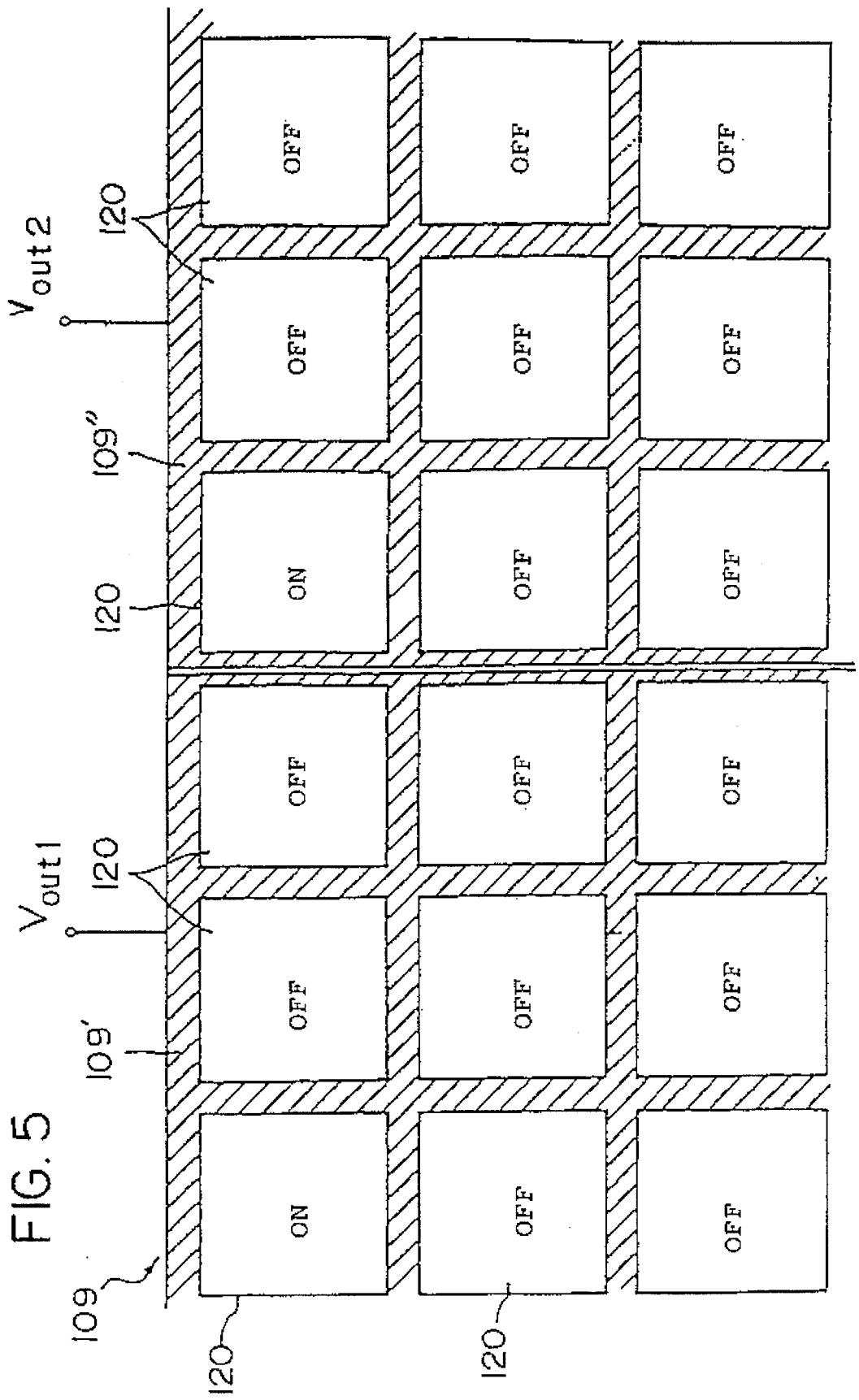
FIG. 5 shows a modified pattern of the photodetective portion according to the invention.
Figure 6:
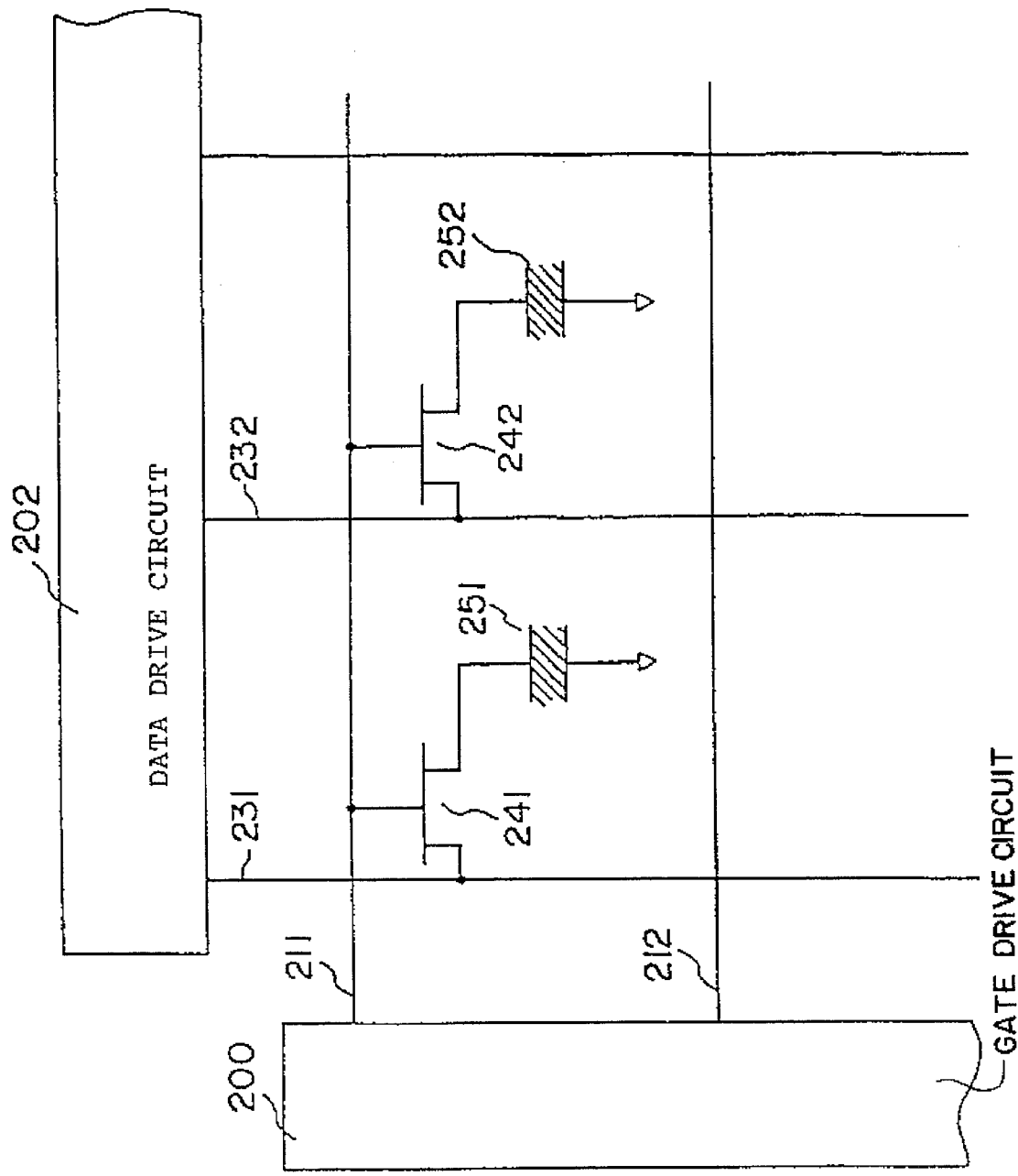
FIG. 6 is a diagram showing an equivalent circuit of a conventional active matrix type liquid crystal display apparatus.
Figure 7:
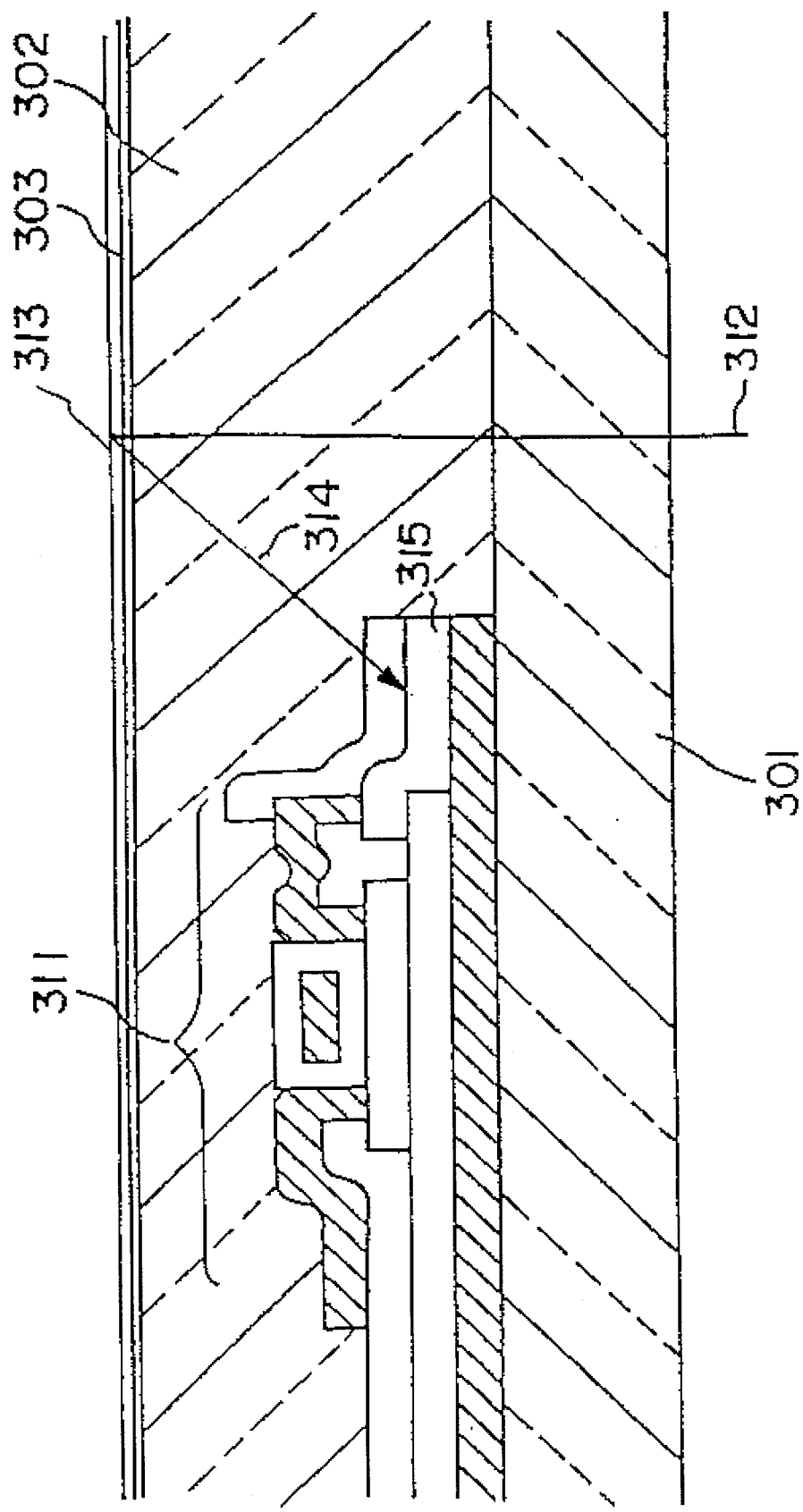
FIG. 7 is a view showing a cross-sectional structure of a conventional image input apparatus.

In the above example, the photodetective portion 109 of the image input section 10 has a lattice-like pattern continued over the entire face of the transparent substrate 106. However, the pattern of the photodetective portion 109 is not limited to this specific one. If the response speed of the liquid crystal is not so high, the photodetective portion 109 may be divided into a plurality of blocks, so as to take out the outputs of the respective blocks. For example, as is shown in FIG. 5, the photodetective portion 109 may be divided into two blocks 109' and 109", so as to take out the outputs $V_{out1}$ and $V_{out2}$ of the respective blocks 109' and 109". In this case, the scanning for read can be performed in parallel by the blocks 109' and 109", so that the total scanning period can be shortened. In the case where the photodetective portion 109 is divided into n blocks, the scanning period can be shortened to be l/n.

As described above, according to the image input/output apparatus of the invention, the image display section and the image input section are formed into a unit, so that the apparatus can be reduced in size as compared with the case where the image display apparatus and the image input apparatus are separately provided. Moreover, a single scanning circuit is shared by the image display section and the image input section, so that the construction of the apparatus can be simplified.

According to the invention, the photodetective portion of the image input section is provided in an area corresponding to gaps between the respective pixels of the image display section. Therefore, the light which has passed through the image display section is not blocked by the photodetective portion, so that the contrast of the image display and the image input can be improved.

According to a method of the invention, the image display and the image input can be performed in an apparatus of reduced size as compared with the case where the image display and the image input are separately performed in different apparatus. Moreover, the image display and the image input can be performed by a single scanning circuit.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An image input/output apparatus comprising:

an image display section which selectively transmits light, said image display section including:
a first transparent substrate,
a second transparent substrate which is opposite to said first transparent substrate,
a liquid crystal portion which is sandwiched between said first transparent substrate and said second transparent substrate,
a plurality of pixel electrodes disposed in a matrix form, said plurality of pixel electrodes being disposed on a surface of said first transparent substrate, whereby said plurality of pixel electrodes are positioned between said liquid crystal portion and said first transparent substrate, a counter electrode disposed on a surface of said second transparent substrate facing said plurality of pixel electrodes, and means for selectively applying voltage to at least desired one of said plurality of pixel electrodes; and an image input section having a photo-detective portion for converting part of said light which has been transmitted through said pixel electrodes of said image display section and reflected from an original surface to be imaged, into an electrical signal.

2. An image input/output apparatus according to claim 1, wherein said photodetective portion is disposed on a portion of said second transparent substrate, said portion corresponding to a portion of said first transparent substrate where said plurality of pixel electrodes are not disposed.

3. An image input/output apparatus according to claim 1, wherein said photodetective portion includes:

a lower electrode capable of blocking light;

a photo-electric converting element formed on said lower electrode; and an upper electrode formed on said photoelectric converting element.

4. An image input/output apparatus according to claim 3, wherein each of said lower electrode and said upper electrode is a single portion with electric continuity.

5. An image input/output apparatus according to claim 4, wherein said photodetective portion is divided into a plurality of blocks which are electrically separated from each other.

6. An image input/output apparatus comprising:

a pair of transparent substrates with liquid crystal sandwiched therebetween;

transparent electrodes which constitute pixels, said transparent electrodes being provided on an inner surface of one of said pair of transparent substrates;

means for selectively applying voltage to said transparent electrodes;

a photodetective portion provided on a surface of the other one of said pair of transparent substrates on which said liquid crystal is not formed; and a transparent layer which covers said photodetective portion, wherein during an image output, light incident from the outside of said other one of said pair of transparent substrates is selectively transmitted by said transparent electrodes, whereby an image is displayed, and wherein during an image input, part of light which is selectively transmitted through said transparent electrodes and then reflected from an original surface to be imaged and incident on said photodetective portion, is converted into an electrical signal, whereby an image signal is produced.

7. A method for inputting/outputting an image by using the apparatus of claim 3, said method comprising the steps of:

sequentially applying voltage to at least any desired one of said plurality of pixel electrodes while irradiating said image display section with light, to selectively transmit part of light for scanning said original surface; and receiving light reflected from said original surface by said photodetective portion, to sequentially convert said received light into an electrical signal by said photoelectric converting element.

* * * * *